Jan. 22, 1924.
E. A. BEACH
VEGETABLE OR FRUIT STRAINER
Filed Sept. 1, 1923
1,481,660
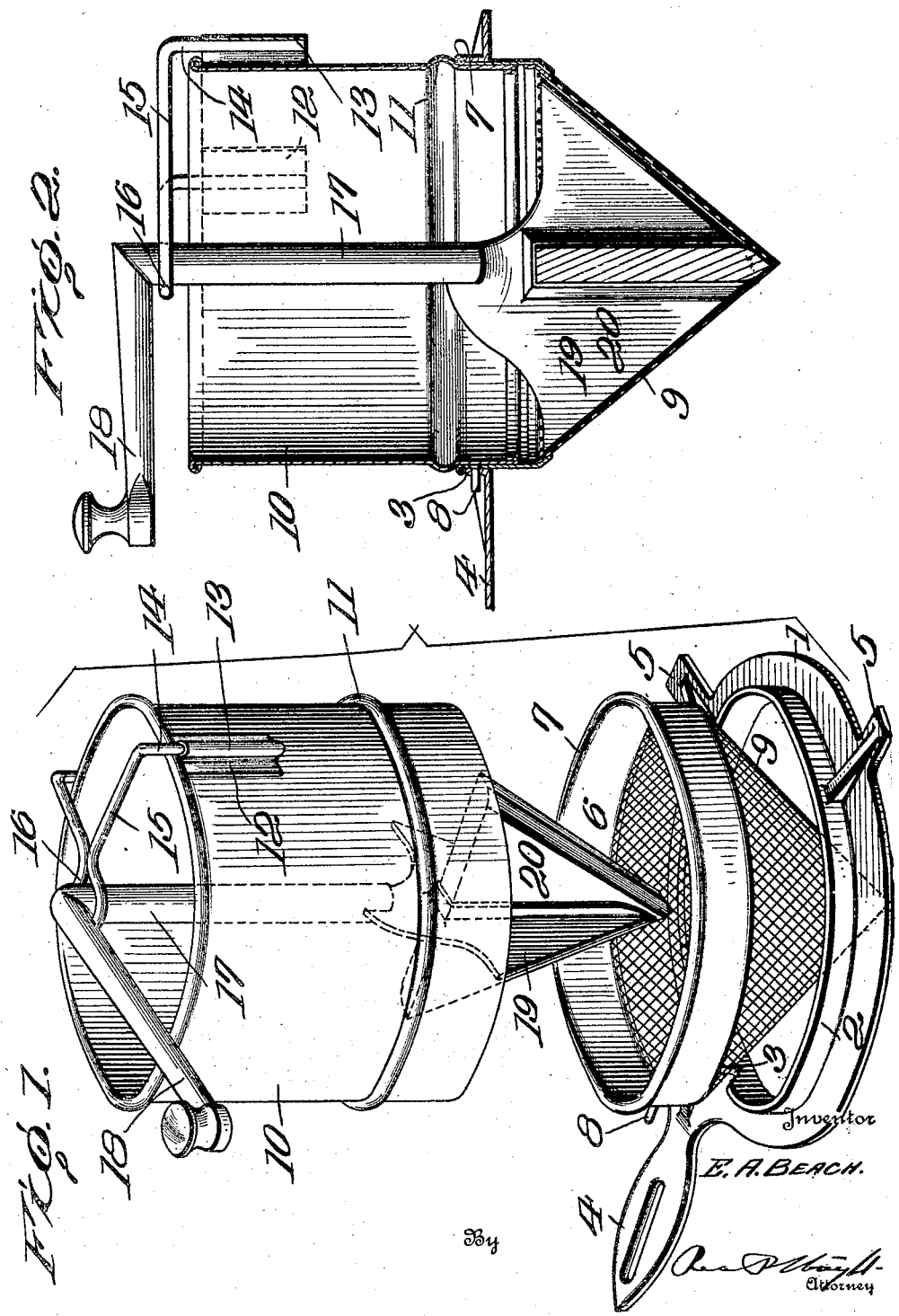

Patented Jan. 22, 1924.

1,481,660

UNITED STATES PATENT OFFICE.

EDWARD A. BEACH, OF ALTOONA, PENNSYLVANIA.

VEGETABLE OR FRUIT STRAINER.

Application filed September 1, 1923. Serial No. 660,629.

*To all whom it may concern:*

Be it known that I, EDWARD A. BEACH, a citizen of the United States, residing at Altoona, in the county of Blair and State of Pennsylvania, have invented certain new and useful Improvements in Vegetable or Fruit Strainers, of which the following is a specification, reference being had therein to the accompanying drawing.

This invention relates to certain new and useful improvements in vegetable or fruit strainers and more particularly to an improvement upon my Patents Nos. 610,789, dated September 13, 1898, and 960,248, dated June 7, 1910, the object being to improve the general construction of strainer whereby the same can be manufactured cheaply and the parts separated in order to allow the parts to be cleaned.

A further object of the invention is to provide a removable support for the stirrer shaft in order to allow the stirrer to be removed from the receptacle, whereby the strainer can be used without the stirrer for various purposes.

Other and further objects of the invention will be hereinafter set forth and the novel features thereof defined by the appended claims.

In the drawings,

Figure 1 is a perspective view of my improved construction of vegetable and fruit strainer showing the parts detached; and Figure 2 is a vertical section through the strainer.

In carrying out my invention I employ a circular supporting frame 1 having a vertically disposed annular flange 2 at its inner edge provided with a notch 3 forming a socket for the purpose hereinafter fully described.

The supporting frame is provided with a handle 4 and outwardly projecting lugs 5 forming supports for the supporting frame in order to allow the same to be placed over various sizes of vessels.

Disposed within the supporting frame is a band 6 having a bead 7 at its upper edge adapted to rest on the upper edge of the flange 2 for supporting the same within the supporting frame, said band carrying a laterally projecting pin 8 adapted to fit within the socket 3 for preventing the band from rotating within the supporting frame. The band 6 carries a conical strainer 9 forming a sieve.

Mounted within the band 6 is a tubular open-ended receptacle 10 provided with an annular bead 11 adjacent its lower edge adapted to engage the bead 7 of the band 6 when the lower portion of the receptacle is forced into the band for supporting the receptacle within the band so that it can be easily and quickly inserted or detached.

Secured to the upper portion of the receptacle 10 are spaced blades 12 provided with vertically disposed sockets 13 into which the depending leg portions 14 of a frame 15 are adapted to be detachably mounted so that the frame 15 can be removed from the socket. The frame 15 is provided with a round portion 16 forming a bearing for a stirrer shaft 17 which is provided with a crank 18 at its upper end for rotating the shaft. The lower end of the stirrer shaft terminates in a pointed blade 19 conforming in shape to the conical screen 9, said blade being bifurcated to receive a blade 20, which is preferably formed of wood.

The edges of the blades 19 and 20 are beveled as shown and the blade 20 is loosely mounted within the blade 19 so that when the stirrer is forced down into the conical sieve, the blades will adjust themselves to the contour of the sieve.

By mounting the stirrer shaft 17 within the detachably mounted frame, the stirrer as a unit can be removed from the receptacle and the strainer and support used for straining purposes without the agitating means.

From the foregoing description it will be seen that I have provided a vegetable and fruit strainer which is exceedingly simple and cheap in construction, the parts being so mounted that they can be readily taken apart or assembled and when assembled, form a device for straining fruits and vegetables.

What I claim is:—

1. A device of the kind described comprising a supporting frame, a conical sieve mounted in said frame, a receptacle mounted in said sieve, a stirrer shaft carried by said receptacle having a bifurcated blade at its lower end and a blade loosely mounted in said bifurcation, said blades conforming in shape to the screen.

2. A device of the kind described comprising a supporting frame having a vertically disposed annular flange having a notch, a conical screen having a band adapted to fit within said flange, a pin carried by said band fitting within said notch, a receptacle mounted in said band, a frame detachably mounted on said receptacle having a bearing, a stirrer shaft revolubly mounted on said frame and blades carried by the lower end of said stirrer shaft arranged at right angles to one another, one of said blades being loosely mounted within the other.

3. A device of the kind described comprising a supporting frame having a screen detachably mounted therein, a receptacle detachably mounted in said screen, said receptacle being provided with sockets, a frame having depending legs mounted within said sockets, said frame being provided with a bearing and a stirrer shaft mounted within said bearing having blades at its lower end coacting with said screen.

In testimony whereof I hereunto affix my signature.

EDWARD A. BEACH.